(12) United States Patent
Schaedlich

(10) Patent No.: US 9,923,410 B2
(45) Date of Patent: Mar. 20, 2018

(54) PRECHARGING CIRCUIT FOR CHARGING AN INTERMEDIATE CIRCUIT CAPACITOR

(71) Applicants: Robert Bosch GmbH, Stuttgart (DE); Samsung SDI Co., Ltd., Yongin-si, Gyeonggi-do (KR)

(72) Inventor: Thomas Schaedlich, Kornwestheim (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 115 days.

(21) Appl. No.: 14/650,323

(22) PCT Filed: Nov. 25, 2013

(86) PCT No.: PCT/EP2013/074554
§ 371 (c)(1),
(2) Date: Jun. 8, 2015

(87) PCT Pub. No.: WO2014/090551
PCT Pub. Date: Jun. 19, 2014

(65) Prior Publication Data
US 2015/0326065 A1    Nov. 12, 2015

(30) Foreign Application Priority Data

Dec. 12, 2012  (DE) .......... 10 2012 222 928

(51) Int. Cl.
*H02J 7/04*    (2006.01)
*B60L 11/00*   (2006.01)
(Continued)

(52) U.S. Cl.
CPC .......... *H02J 7/045* (2013.01); *B60L 3/0038* (2013.01); *B60L 3/0084* (2013.01);
(Continued)

(58) Field of Classification Search
CPC ...................................... H02J 7/045
(Continued)

(56) References Cited

U.S. PATENT DOCUMENTS 4,999,775 A * 3/1991 Muraoka ............. B60R 21/0173
                                                       180/271
6,211,681 B1 * 4/2001 Kagawa ................... B60K 6/46
                                                       320/104
(Continued)

FOREIGN PATENT DOCUMENTS

CN    102511009 A    6/2012
CN    202586862 U    12/2012
(Continued)

OTHER PUBLICATIONS

International Search Report corresponding to PCT Application No. PCT/EP2013/074554, dated Feb. 19, 2015 (German and English language document) (5 pages).

*Primary Examiner* — Drew A Dunn
*Assistant Examiner* — Jerry D Robbins
(74) *Attorney, Agent, or Firm* — Maginot, Moore & Beck LLP

(57) ABSTRACT

A pre-charging circuit for charging an intermediate circuit capacitor is provided having a first electronic component, a second electronic component and a diagnostic circuit. The diagnostic circuit is designed for functional testing of the first electronic component and/or of the second electronic component and comprises an energy source with a terminal voltage. A voltage drop can be induced on the first electronic component by the energy source, as a result of which the functional performance of the first electronic component and/or of the second electronic component can be tested. The diagnostic circuit has a diagnosis switch via which the energy source can be connected to the first electronic com- (Continued)

ponent in such a manner that the dropping voltage on the first electronic component corresponds to the terminal voltage.

17 Claims, 2 Drawing Sheets

(51) Int. Cl.
    *H02J 7/34* (2006.01)
    *B60L 3/00* (2006.01)
    *H02J 7/00* (2006.01)

(52) U.S. Cl.
    CPC ........... *B60L 11/005* (2013.01); *H02J 7/0054* (2013.01); *H02J 7/345* (2013.01); *B60L 2270/20* (2013.01)

(58) Field of Classification Search
    USPC .......................................................... 320/166
    See application file for complete search history.

(56) References Cited

U.S. PATENT DOCUMENTS

| | | | | |
|---|---|---|---|---|
| 7,265,953 B2* | 9/2007 | Hourai | ................... | G01R 31/40 361/159 |
| 7,884,579 B2* | 2/2011 | Overland | .............. | H02M 7/217 320/140 |
| 8,688,317 B2* | 4/2014 | Boiron | ............... | G01R 31/3278 324/426 |
| 2012/0191294 A1 | 7/2012 | Boiron et al. | | |

FOREIGN PATENT DOCUMENTS

| | | |
|---|---|---|
| DE | 10 2011 016 532 A1 | 6/2012 |
| DE | 10 2011 004 516 A1 | 8/2012 |
| EP | 0 570 934 A2 | 11/1993 |

* cited by examiner

PRECHARGING CIRCUIT FOR CHARGING AN INTERMEDIATE CIRCUIT CAPACITOR

This application is a 35 U.S.C. § 371 National Stage Application of PCT/EP2013/074554, filed on Nov. 25, 2013, which claims the benefit of priority to Serial No. DE 10 2012 222 928.0, filed on Dec. 12, 2012 in Germany, the disclosures of which are incorporated herein by reference in their entirety.

The present disclosure relates to a precharging circuit for charging an intermediate circuit capacitor, having a first electronic component, a second electronic component and a diagnosis circuit, wherein the diagnosis circuit is designed to test the function of the first electronic component and/or of the second electronic component and comprises a power source with a terminal voltage, wherein a voltage drop across the first electronic component is producible by the power source, as a result of which the functionality of the first electronic component and/or of the second electronic component can be tested.

BACKGROUND

A charging device for a motor vehicle, having a charging unit which is designed to charge a battery of the motor vehicle, is known from DE 10 2011 016 532 A1. Diagnosis means, by means of which the functionality of the charging unit can be tested, are provided. For this purpose, a test voltage is coupled into an AC input of the charging unit and voltages caused by the test voltage are measured at different measurement points of the charging device. It is possible to test individual assemblies of the charging unit using the diagnosis means. It is not possible to test individual electronic components.

SUMMARY

The precharging circuit according to the disclosure has a diagnosis circuit having a diagnosis switch via which the power source is connectable to the first electronic component such that the voltage dropping across the first electronic component corresponds to the terminal voltage.

By means of the precharging circuit according to the disclosure, the first and the second electronic components can be tested for malfunction or damage in a targeted manner. Preferably, said components are the two electronic components which are the most heavily loaded components in a precharging circuit.

By way of example, the first electronic component is designed as a resistor and the second electronic component is designed as a transistor. The precharging current for the intermediate circuit capacitor is constantly regulated by means of the two components.

Preferably, the power source is designed as an ideal current source which supplies a constant current.

Within the scope of the present disclosure, it is assumed that a voltage which drops across a transistor that is in a current-conducting state is negligible.

In the case of a particularly advantageous embodiment, a microcontroller for measuring and evaluating the voltage dropping across the first electronic component is provided. By way of example, a diagnosis path is provided, via which the voltage dropping across the first electronic component is supplied to the microcontroller.

Preferably, the microcontroller compares the measured voltage with a preset value. By way of example, a voltage which corresponds to the product of the current generated by the power source and the resistance of the first electronic component is selected for the preset value. If the measured voltage drop deviates from the preset value, the respective electronic component the function of which was tested is faulty. Preferably, when calculating the preset value, a tolerance band is provided, with the result that minor fluctuations in the measured voltage do not lead to an incorrect evaluation of the state of function of the electronic components.

In a particularly preferred embodiment of the disclosure, the diagnosis switch is switchable by the microcontroller. Thus, tests of the function of the electrical components can be performed by the microcontroller. By way of example, the microcontroller comprises a controller via which the diagnosis switch is switched. In this case, within the scope of the present disclosure, the wording "the controller switches" is synonymous with the wording "the microcontroller switches". This applies not only to the diagnosis switch but also to all other switches and all the embodiments within the scope of the present disclosure.

It is particularly preferable for the power source to be connectable in parallel with the first electronic component via the diagnosis switch. If the functionality of the first electronic component is to be tested, the power source is connected in parallel with the electronic component by means of the diagnosis switch. If the voltage dropping across the first electronic component corresponds to the terminal voltage of the power source, the first electronic component is functional. If the voltage measured by the microcontroller differs significantly from the terminal voltage of the power source, that is to say if the difference is greater than the value which is preset in the microcontroller inclusive of the predefined tolerance band, a function of the first electronic component is no longer present.

In another embodiment of the disclosure, the second electronic component is designed as a diagnosis switch. By way of example, the diagnosis switch is designed to test both the functionality of the first and also the functionality of the second electronic component. For this purpose, a further switch is provided, via which the power source is connectable to the two electronic components such that the terminal voltage of the power source is present across both electronic components. If the second electronic component is designed as a diagnosis switch and if the voltage drop across the second electronic component in a current-conducting state can be ignored, the voltage dropping across the first electronic component corresponds to the terminal voltage.

In addition, the diagnosis switch can be designed as a transistor which is switchable into a conductive and a blocking state by the microcontroller. By virtue of the transistor being switchable by the microcontroller, the former can be used as diagnosis switch and hence for testing the function of the two electronic components. If, for example, the functionality of the first electronic component is to be tested, the transistor is switched into a conductive state by the microcontroller. In this case, the resistance of the transistor in the conductive state is negligible, for which reason, the functionality of the first electronic component being assumed, the measurable voltage drop across the first electronic component corresponds to the terminal voltage of the power source. If the voltage measured across the first electronic component deviates significantly from the terminal voltage of the power source, the first electronic component is defective.

Particularly preferably, the transistor is switchable into a blocking state for the purpose of testing the function of said transistor, wherein the voltage dropping across the first electronic component has a value of 0. The terminal voltage of the power source is present across the transistor and the first electronic component. If the transistor is switched into a blocking state by the microcontroller, no current flows through the first electronic component, for which reason no voltage drop is measurable across the first electronic component. Consequently, the functionality of the transistor is given.

In addition, a decoupling switch for decoupling the precharging circuit from the intermediate circuit capacitor can be provided. As a result of this, the influence or a malfunction in the intermediate circuit during a test of the function of the first electronic component and/or of the second electronic component can be blocked. Thus, a fault in the precharging circuit can be unambiguously diagnosed. If, for example, the diagnosis circuit is configured only for testing the function of the first electronic component, the second electronic component is designed as a decoupling switch which is switched into a blocking state for the purpose of decoupling. If the diagnosis circuit is configured such that it can test the function of both electronic components, the decoupling switch is designed as additional switch which is controllable by the microcontroller and decouples the precharging circuit from the intermediate circuit capacitor when in the open state.

A charging circuit for a motor vehicle, comprising a precharging circuit according to the disclosure, also falls within the scope of the disclosure. By way of example, the charging circuit also has a battery and two main contactors via which the battery is connectable to an intermediate circuit capacitor. In order to charge the intermediate circuit capacitor, it is preferable for one main contactor first to be closed and for the second main contactor to be bypassed by means of the precharging circuit. If the intermediate circuit capacitor has reached a sufficient state of charge, the second main contactor is closed.

BRIEF DESCRIPTION OF THE DRAWINGS

Exemplary embodiments of the disclosure are explained in more detail with reference to the drawings and the following description. In the drawings.

DETAILED DESCRIPTION

Figure 1:
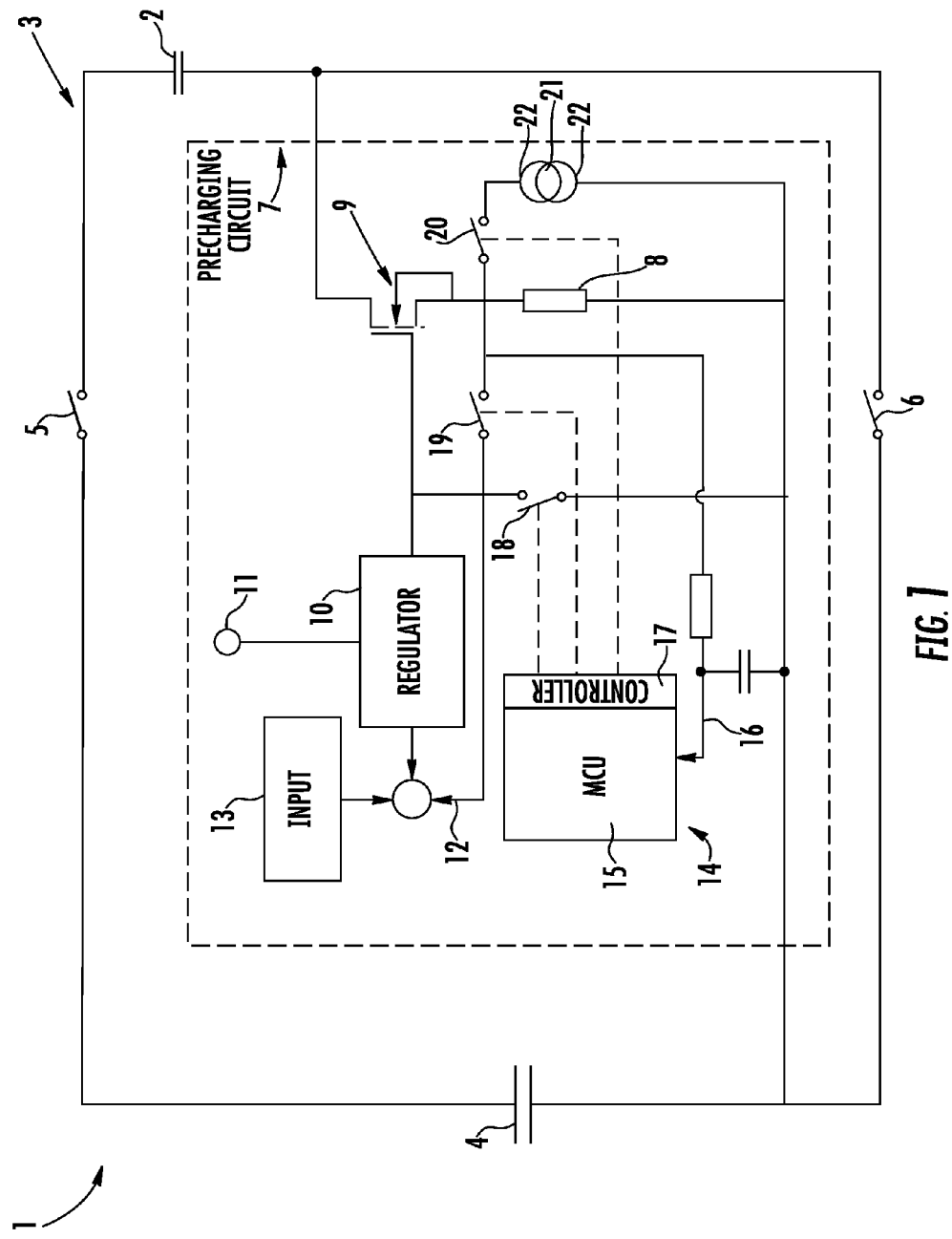
FIG. 1 shows a charging circuit with a precharging circuit in a first embodiment.

FIG. 1 shows a charging circuit 1 for charging an intermediate circuit capacitor 2 which is arranged in an intermediate circuit 3. The charging circuit 1 comprises a battery 4 for providing a charging voltage, a first contactor 5 and a second contactor 6 for connecting the battery 4 to the intermediate circuit capacitor 2.

The charging circuit 1 also comprises a precharging circuit 7 by means of which a constant precharging current for charging the intermediate circuit capacitor 2 can be adjusted when the first contactor 5 is closed. For this purpose, the precharging circuit 7 has a first electronic component designed as a resistor 8 and a second electronic component designed as a transistor 9.

The precharging circuit 7 also comprises a regulator 10 which is supplied with an operating voltage via a connection 11. The precharging current is supplied as actual variable to the regulator 10 via a return line 12 and a predefined setpoint value is supplied to the regulator 10 via an input 13. The regulator 10 compares the actual value with the setpoint value and regulates the transistor 9 on the basis of existing deviations such that a constant precharging current is adjusted.

The precharging circuit 7 comprises a diagnosis circuit 14 with a microcontroller 15 which monitors the regulated flow of current or the charging process via a diagnosis path 16.

The microcontroller 15 has a controller 17 via which it can switch by means of a first switch 18 the decoupling switch, which is designed as a transistor 9, for decoupling the precharging circuit 7 from the intermediate circuit 3. For this purpose, the microcontroller switches the transistor 9 into a blocking state. The microcontroller 15 is optionally also able to switch a second switch 19 via the controller 17, which second switch interrupts the return line 12 to the regulator 10. The microcontroller can also switch via its controller 17 a diagnosis switch designed as third switch 20, with the result that a power source designed as a current source 21 is connected in parallel with the resistor 8 when the third switch 20 is closed.

The current source 21 causes a terminal voltage at the terminals 22 thereof. The current source 21 is part of the diagnosis circuit 14 and hence a component part of the precharging circuit 7.

The mode of operation of the diagnosis circuit 14 is to be explained briefly below with reference to FIG. 1. If the function of the resistor 8 is to be tested, the precharging circuit 7 is isolated from the intermediate circuit 3. For this purpose, the transistor 9 is switched into a blocking state by the controller 17 of the microcontroller 15 closing the first switch 18. Optionally, the return line 12 to the regulator 10 can also be interrupted by opening the second switch 19. By closing the third switch 20, the current source 21 is connected in parallel with the resistor 8. As a result of this, the power source produces a voltage drop across the resistor 8, as a result of which the functionality of the resistor 8 can be tested.

The voltage dropping across the resistor 8 is supplied to the microcontroller 15 via the diagnosis path 16. The microcontroller 15 measures and evaluates the voltage dropping across the resistor 8. For this purpose, the microcontroller compares the voltage drop across the resistor 8 to a predefined value which corresponds to the terminal voltage of the current source 21. If the voltage measured across the resistor 8 is identical to the terminal voltage of the current source 21 or if the measured voltage is within a tolerance band, predefined for the microcontroller 15, around the terminal voltage of the current source 21, the resistor 8 is functional.

If the microcontroller 15 determines a significant deviation between the voltage measured across the resistor 8 and the predefined value and if said deviation is greater than the tolerance band predefined for the microcontroller 15, the resistor 8 is faulty.

Figure 2:
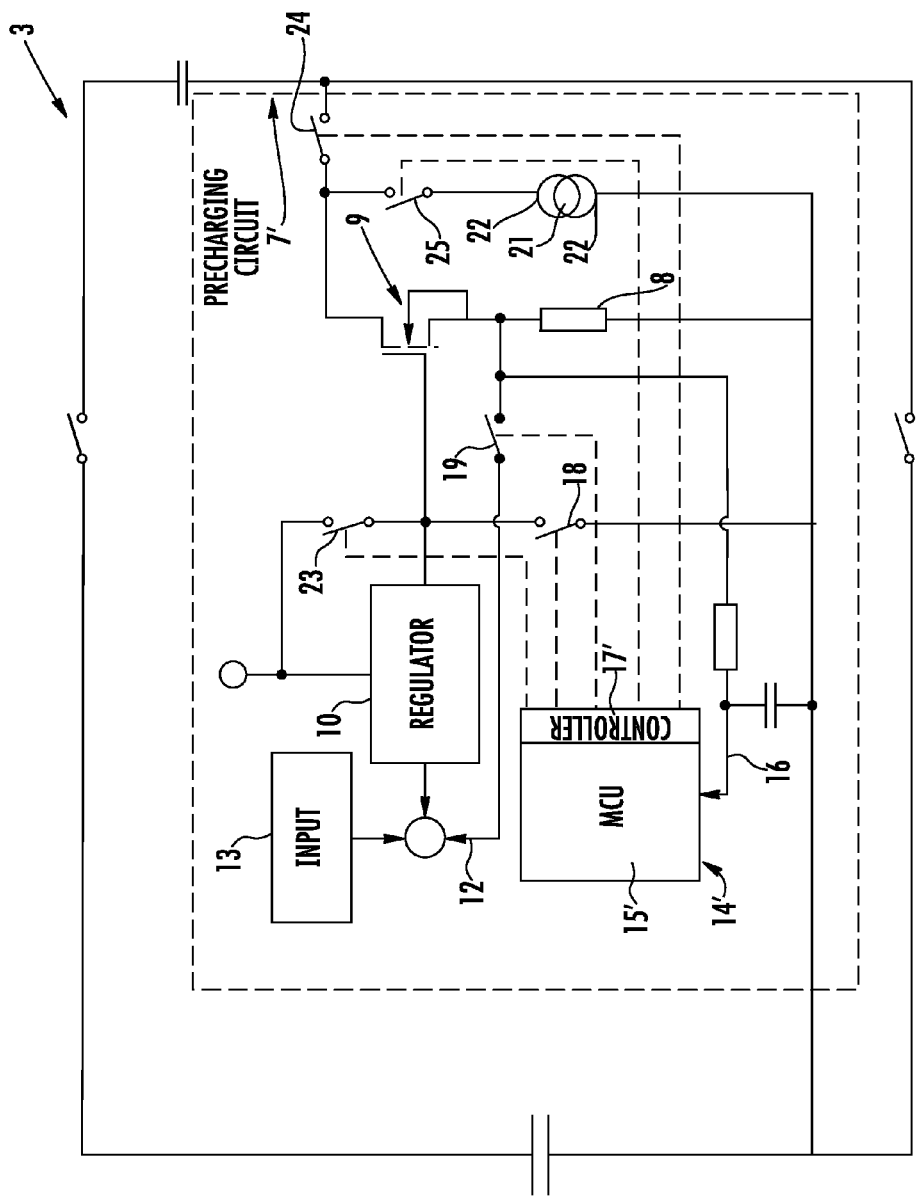
FIG. 2 shows a charging circuit with a precharging circuit in a second embodiment.

FIG. 2 shows a second embodiment of the precharging circuit 7', wherein identical components as in the first embodiment are provided with identical reference signs. According to FIG. 2, the precharging circuit 7' comprises a diagnosis circuit 14' which is designed to test the function of the resistor 8 and of the transistor 9. The diagnosis circuit 14' has a microcontroller 15' with a controller 17'.

In contrast to the diagnosis circuit 14 from FIG. 1, the diagnosis circuit 14' has a fourth switch 23 which is switchable via the controller 17' of the microcontroller 15' and which can switch the transistor into a current-conducting state via the controller 17'.

Another difference from the diagnosis circuit 14 from FIG. 1 consists in that, in the case of the diagnosis circuit 14', the second electronic component is designed as a diagnosis switch. The transistor 9 is provided as diagnosis switch. The transistor 9 can be switched into a blocking state by closing the first switch 18 and into a conductive state by closing the fourth switch 23.

Furthermore, in contrast to the diagnosis circuit 14 from FIG. 1, the decoupling switch is designed as fifth switch 24 which is switchable via the microcontroller 15' and via which the precharging circuit 7' is decouplable from the intermediate circuit 3.

The diagnosis circuit 14' also has a sixth switch 25 via which the current source 21 is connectable to the resistor 8 and the transistor 9 in a manner controlled by the controller 17'. In contrast to the diagnosis circuit 14, the function of the third switch 20 (FIG. 1) is dispensed with in the case of the diagnosis circuit 14'.

The mode of operation of the second embodiment of the precharging circuit 7' is to be explained briefly in more detail below with reference to FIG. 2.

In order to test the function of the resistor 8 or of the transistor 9, the precharging circuit 7' is decoupled from the intermediate circuit 3 by opening the fifth switch 24 by means of the controller 17' or by means of the microcontroller 15'. Optionally, the return line to the regulator 10 can be interrupted by the second switch 19 being opened by the microcontroller 15'. Closing the sixth switch 25 causes the terminal voltage of the current source 21 produced at the terminals 22 to be present across the transistor 9 and the resistor 8.

If the functionality of the transistor 9 is to be tested, the transistor 9 is switched into a blocking state using the microcontroller 15' by closing the first switch 18. If, in this switching state of the transistor 9, no voltage drop across the resistor 8 can be calculated by the microcontroller 15' via the diagnosis path 16 or if the voltage dropping across the resistor 8 has a value of 0, the transistor 9 is functional. If a voltage drop across the resistor 8 can be measured by the microcontroller 15' when the transistor 9 is in a blocking state, the transistor 9 is faulty.

If the functionality of the resistor 8 is to be tested, the first switch 18 is opened by the microcontroller 15' and the fourth switch 23 is closed, with the result that the transistor 9 is in a conductive state. If the voltage dropping across the resistor 8 and measured by the microcontroller 15' via the diagnosis path 16 has the value of the terminal voltage of the current source 21, the resistor 8 is functional. If the voltage dropping across the resistor 8 and measured by the microcontroller 15' deviates significantly from a predefined value, the resistor 8 is faulty.

The testing of the functionality of the resistor 8 is based on the assumption that a voltage drop across the transistor 9 which is in a conductive state can be ignored. Thus, by switching the transistor 9 into a conductive state, it is possible to connect the current source 21 to the resistor 8 such that the voltage dropping across the resistor 8 corresponds to the terminal voltage.

The invention claimed is:

1. A precharging circuit for charging an intermediate circuit capacitor, the precharging circuit comprising:
   a resistor;
   a transistor configured to be switched to a conductive state and a blocking state; and
   a diagnosis circuit configured to test a functionality of at least one of the resistor and the transistor, the diagnosis circuit including:
   a current source having a terminal voltage and configured to produce a voltage drop across the resistor corresponding to the terminal voltage to test the functionality of at least one of the resistor and the transistor;
   a first diagnosis switch configured to selectively connect the current source to the resistor to produce the voltage drop across the resistor; and
   a second diagnosis switch configured to connect the current source to the resistor and the transistor.

2. The precharging circuit as claimed in claim 1, further comprising:
   a microcontroller configured to measure and evaluate the voltage drop across the resistor.

3. The precharging circuit as claimed in claim 2, wherein the microcontroller is configured to compare the measured voltage drop with a preset value.

4. The precharging circuit as claimed in claim 2, wherein the microcontroller is configured to switch the first diagnosis switch.

5. The precharging circuit as claimed in claim 1, wherein the first diagnosis switch is configured to selectively connect the current source in parallel with the resistor.

6. The precharging circuit as claimed in claim 1, wherein the transistor is a third diagnosis switch.

7. The precharging circuit as claimed in claim 1, wherein:
   the transistor is switched into the blocking state to test the functionality of the transistor; and
   the voltage drop across the resistor has a value of zero.

8. The precharging circuit as claimed in claim 2, further comprising:
   a decoupling switch configured to decouple the precharging circuit from the intermediate circuit capacitor.

9. The precharging circuit as claimed in claim 6, further comprising:
   a fourth diagnosis switch configured to switch the transistor into the conductive state.

10. The precharging circuit as claimed in claim 8, wherein the microcontroller is configured to switch the decoupling switch.

11. The precharging circuit as claimed in claim 8, wherein the decoupling switch is further configured to decouple the precharging circuit from an intermediate circuit that includes the intermediate circuit capacitor.

12. The precharging circuit as claimed in claim 11, further comprising:
   a controller operably connected to the decoupling switch, wherein at least one of the controller and the microcontroller is configured to switch the decoupling switch to decouple the precharging circuit from the intermediate circuit.

13. A charging circuit for a motor vehicle, comprising:
   an intermediate capacitor; and
   a precharging circuit coupled to the intermediate capacitor, the precharging circuit comprising:
   a resistor;
   a transistor configured to be switched to a conductive state and a blocking state; and
   a diagnosis circuit configured to test a functionality of at least one of the resistor and the transistor, the diagnosis circuit comprising:
   a current source having a terminal voltage and being configured to produce a voltage drop across the resistor that corresponds to the terminal voltage to test the functionality of at least one of the resistor and the transistor;

a first diagnosis switch configured to selectively connect the current source to the resistor to produce the voltage drop across the resistor; and a second diagnosis switch configured to connect the current source to the resistor and the transistor.

14. The charging circuit as claimed in claim 13, further comprising:

a fourth diagnosis switch configured to switch the transistor into the conductive state, wherein the transistor is a third diagnosis switch.

15. The charging circuit as claimed in claim 13, further comprising:

a microcontroller configured to measure and evaluate the voltage drop across the resistor.

16. The charging circuit as claimed in claim 15, further comprising:

a decoupling switch configured to decouple the precharging circuit from the intermediate capacitor, wherein the microcontroller is further configured to perform at least one of: (i) compare the measured voltage drop with a preset value, (ii) switch the first diagnosis switch, or (iii) switch the decoupling switch.

17. The charging circuit as claimed in claim 16, further comprising:

a controller operably connected to the decoupling switch, wherein at least one of the controller and the microcontroller is configured to switch the decoupling switch to decouple the precharging circuit from an intermediate circuit that includes the intermediate circuit capacitor.

* * * * *